United States Patent
Blanc et al.

(10) Patent No.: US 8,410,239 B2
(45) Date of Patent: Apr. 2, 2013

(54) ORGANOPOLYSILOXANE COMPOSITIONS CROSSLINKABLE INTO ELASTOMERIC SILICONE FOAMS

(75) Inventors: Delphine Blanc, Lyons (FR); Roser Casas, Barcelona (ES); Christian Pusineri, Serezin du Rhone (FR)

(73) Assignee: Bluestar Silicones France, Lyons (FR)

( * ) Notice: Subject to any disclaimer, the term of this patent is extended or adjusted under 35 U.S.C. 154(b) by 351 days.

(21) Appl. No.: 12/308,114

(22) PCT Filed: Jun. 5, 2007

(86) PCT No.: PCT/EP2007/055493
§ 371 (c)(1),
(2), (4) Date: Sep. 3, 2009

(87) PCT Pub. No.: WO2007/141250
PCT Pub. Date: Dec. 13, 2007

(65) Prior Publication Data
US 2010/0003484 A1    Jan. 7, 2010

(30) Foreign Application Priority Data

Jun. 7, 2006 (FR) ...................................... 06 05061

(51) Int. Cl.
*C08G 77/20* (2006.01)

(52) U.S. Cl. .......................................... 528/32; 528/31

(58) Field of Classification Search ................... 528/31, 528/32
See application file for complete search history.

(56) References Cited

U.S. PATENT DOCUMENTS

| | | | |
|---|---|---|---|
| 4,418,157 A | 11/1983 | Modic | |
| 4,590,222 A | 5/1986 | Bauman et al. | |
| 4,808,634 A | 2/1989 | Uriarte et al. | |
| 4,871,782 A | 10/1989 | Modic et al. | |
| 5,252,627 A | 10/1993 | Bauman et al. | |
| 5,358,975 A | 10/1994 | Anderson | |
| 5,744,507 A | 4/1998 | Angell | |
| 5,744,508 A | 4/1998 | Yaginuma et al. | |
| 5,900,438 A | 5/1999 | Miyoshi et al. | |

FOREIGN PATENT DOCUMENTS

| | | |
|---|---|---|
| EP | 0 355 429 A2 | 2/1990 |
| FR | 2 694 760 A1 | 2/1994 |
| FR | 2 686 547 A3 | 7/1998 |

OTHER PUBLICATIONS

Freeman (Silicones, Published for the Plastics Institute, ILIFFE Books Ltd., p. 27 (1962)).*
International Search Report PCT/EP2007/055493 dated Sep. 28, 2007.

* cited by examiner

*Primary Examiner* — Kuo-Liang Peng
(74) *Attorney, Agent, or Firm* — SNR Denton US LLP

(57) ABSTRACT

Novel organopolysiloxane compositions crosslinkable into elastomeric foams (or "silicone foams") have a low density, that is, less than 0.20 g/cm$^3$ and also have good mechanical properties.

9 Claims, No Drawings

ORGANOPOLYSILOXANE COMPOSITIONS CROSSLINKABLE INTO ELASTOMERIC SILICONE FOAMS

CROSS-REFERENCE TO PRIORITY/PCT APPLICATION

This application claims priority under 35U.S.C. §119 of FR 06/05061, filed Jun. 7, 2006 and is the national stage of PCT/EP2007/055493, filed Jun. 5, 2007, and designating the United States (published in the French language on Dec. 13, 2007, as WO 2007/141250A1; the title and abstract were also published in English), each hereby expressly incorporated by reference in its entirety and each assigned to the assignee hereof.

The present invention relates to novel organopolysiloxane compositions intended to generate an elastomeric foam (known as "silicone foam") of low density, that is to say of less than 0.20 g/cm$^3$, and exhibiting good mechanical properties.

The expression "silicone foam" denotes a polyorganosiloxane composition in the foam form. Silicone foams are well known in the art and their preparation is described in a number of patents.

Several techniques exist for producing silicone foams. A first technique employs a condensation reaction with release of volatile by-products. This is the case in particular for the systems using the condensation reaction of the SiH—SiOH type, which makes it possible to release hydrogen. For example, French patent No. FR-A-2 589 872 describes a silicone foam precursor composition comprising an organosilicon polymer comprising siloxane units having hydroxyl groups bonded to the silicon, an organosilicon polymer comprising siloxane units having hydrogen atoms bonded to the silicon, a catalyst, for example a tin compound, and a finely divided filler comprising silica which has been treated to become hydrophobic. These compositions cure via polycondensation reaction and, although it being satisfactory in many regards, the tin-catalyzed compositions described in French patent No. FR-A-2 589 872 are regarded as rather unsatisfactory as a result of the use of a tin catalyst, which may exert certain undesirable toxic effects. Moreover, the foams thus obtained require, in order to exhibit acceptable characteristics, the use of a dynamic mixer and even then it is rather problematic to ensure that the foaming is uniform. The cost of this type of product is relatively high.

An alternative form described in U.S. Pat. No. 3,923,705 consisted in providing compositions comprising polydiorganosiloxanes carrying hydrogen atoms bonded to the silicon available for a condensation reaction with polydiorganosiloxanes carrying hydroxyl groups bonded to the silicon (silanols) in the presence of a platinum catalyst. This reaction thus makes it possible to construct the network while producing gaseous hydrogen necessary for the formation of a silicone foam. In this type of formulation, the formation of gas is also proportional to the rate of crosslinking and consequently the density of the foams obtained is difficult to control, thus explaining the difficulties in obtaining low-density foams by this technique. These compositions can additionally comprise a polydiorganosiloxane carrying vinyl groups bonded to the silicon which crosslink simultaneously by polyaddition reactions with the polydiorganosiloxanes carrying hydrogen atoms bonded to the silicon, thus participating in the construction of the network of the silicone foam.

According to another alternative form described in U.S. Pat. No. 4,189,545, silicone foams are prepared from a composition comprising water, a polydiorganosiloxane carrying vinyl groups bonded to the silicon, a polydiorganosiloxane carrying hydrogen atoms bonded to the silicon, carried by units in the chain and not exclusively at the chain end, in order to be able to act as crosslinking agent. The water reacts with the polysiloxane comprising hydride functional groups, thus producing gaseous hydrogen and a silanol. The silanol then reacts with the polydiorganosiloxane comprising hydride functional groups via a condensation reaction, thus generating a second molecule of gaseous hydrogen, while another polydiorganosiloxane carrying vinyl groups bonded to the silicon will simultaneously react, by an addition reaction, with another polydiorganosiloxane comprising hydride functional groups, thus participating in the construction of the network of the silicone foam. The main contribution made by this technique is that the gaseous hydrogen is produced without addition of silanol and with the addition of a small amount of water.

Another technique uses porogenic agents or additives added to the silicon matrix which, under the action of heat, expand the material:

either by decomposition with release of gas, the case in particular of derivatives of azo type, for example azodicarbonamide, which will make it possible to release nitrogen, carbon dioxide gas and ammonia. This type of expanding agent, despite the fact that it is widely used for other materials, presents serious problems of toxicity (release of hydrazine), or by a phase change (liquid to gas), the case in particular of low-boiling-point solvents.

Another technique employs a mechanical introduction of a gas (nitrogen) into the silicone matrix under pressure, followed by passage into a dynamic mixer, which makes it possible to access foams having good characteristics; however, they require very bulky and expensive equipment.

Finally, mention may also be made of a technique employing microwaves (U.S. Pat. No. 4,026,844).

However, the techniques which make use of silanol as source of expanding agent have a tendency to give foams exhibiting densities which are too high for numerous applications, for example those intended for the transportation industry. Moreover, when foams of moderate density are obtained, this is generally achieved at the expense of the mechanical properties (tensile strength, tear strength, and the like).

The production of low-density silicone foams from a composition of relatively low viscosity still remains a problem which arouses interest. For example, U.S. Pat. No. 4,418,157 describes silicone foam precursor compositions exhibiting, before crosslinking, a viscosity of less than 100 000 mPa·s. As is indicated in that patent, it is known (see column 2, lines 13 to 24) that the greater the viscosity of the composition, the less dense the resulting foam. Thus it is that a novel approach is described in this patent which consists in preparing a composition having a viscosity of less than 100 000 mPa·s and comprising a silicone base capable of crosslinking by polyaddition or polycondensation, a silicone resin of "MQ" type (nomenclature of the silicones as described, for example, in the work by Walter Noll "Chemistry and Technology of Silicones", Academic Press, 1968, 2nd edition, on pages 1 to 9), optionally comprising vinyl functional groups, and water, which is described as a key constituent for the genesis of gaseous hydrogen as described above.

Mention may be made, as other example of low-density silicon foams, of U.S. Pat. No. 5,436,274, which describes compositions comprising a silicone base capable of crosslinking by polyaddition, a silicone resin of "MQ" type, comprising vinyl functional groups, and water, the presence of which is essential (referenced reactant D in that patent), and a mixture of an alcohol ("alkanol") and of a diol which is specific.

However, these precursor compositions for low-density silicone foams exhibit the disadvantage of exhibiting problems of homogeneity on storage as a result of the separation of the water from the other constituents. For example, in the case of precursor compositions provided in the two-component form and after lengthy storage, it is then necessary to mix the water with the other constituents, before mixing the two parts of the composition. Specifically, as is clearly indicated in French patent No. FR-A-2 419 962 (equivalent to U.S. Pat. No. 4,189,545), it is essential for the water to be able to react with the polysiloxane comprising hydride (≡SiH) functional groups in the chain in a proportion of at least 0.2 mol of hydride per mole of water in order for sufficient gaseous hydrogen to be released to produce a suitable foam.

Moreover, although the compositions described in U.S. Pat. No. 4,418,157 (examples 1 to 4) make it possible to generate foams having good mechanical properties, the densities obtained are between 0.28 and 0.41 g/cm$^3$, which therefore no longer meet the expectations of industry, for example the transportation industry, which is always looking for less and less dense foams in order to lighten structures (motor vehicles, planes, trains, boats, and the like) while keeping the good mechanical properties.

An example of a silicone foam precursor composition exhibiting an improved resistance to combustion is described in the reference WO-A-00/46282. The composition described comprises a silicone base which crosslinks by a polyaddition reaction (polyorganosiloxane oil comprising an ≡SiH functional group/polyorganosiloxane oils comprising an ≡SiVi functional group/Pt catalyst, with Vi=vinyl group), a compound comprising a hydroxyl functional group and wollastonite (the examples describe compositions with high levels of fillers, approximately 21 parts by weight of fillers with respect to the total weight of the composition). It should be noted that the viscosities of the compositions prepared in the examples (Example 1, Table 2) are all greater than 190 000 mPa·s. As is indicated above, it is known (U.S. Pat. No. 4,418,157, see column 2, lines 13 to 24) that the greater the viscosity of the composition, the less dense the resulting foam. It should be pointed out that, from the most viscous composition (Table 2, page 13, composition [1-1], viscosity of 274 000 mPa·s) to the least viscous composition [1-3] (viscosity=198 000 mPa·s), the density of the foam obtained increases (from 0.20 g/cm$^3$ to 0.25 g/cm$^3$), thus confirming the known teaching relating to the difficulty in obtaining low-density foams from compositions of low viscosity before crosslinking. In point of fact, for reasons of optimization with regard to the use of these compositions, either by the final user or by manufacturers using silicone foam production lines, it is vital to be able to have available a composition which, before crosslinking, exists in a form of relatively low viscosity which readily flows in the appropriate tools. The term "composition of relatively low viscosity" is understood to mean compositions having a viscosity at 25° C. of less than 15 000 mPa·s.

Furthermore, the silicone foams industry is always looking for novel silicone foam precursor compositions having a low viscosity, that is to say of less than 15 000 mPa·s at 25° C., which are capable of exhibiting good properties of resistance to combustion. This is because excellent behavior towards fire is however necessary since silicone foams are frequently used for the protection of essential components, such as electrical cables or electronic relays, allocated, for example, to equipment in which dangerous products are treated or to contrivances in which human beings are conveyed. The poor working condition of these components during a fire might prevent alarm or safety systems from operating.

The problem considered here can thus be summarized as the search for a technical compromise between specifications, a priori contradictory, for the preparation of a composition of low viscosity, that is to say of less than 50 000 mPa·s, which is the precursor of a silicone foam of low density, that is to say of less than 0.20 g/cm$^3$, having good mechanical properties.

An objective of the present invention is thus to provide a novel organopolysiloxane composition of low viscosity, that is to say of less than 15 000 mPa·s, which is intended to generate, after crosslinking, a silicone foam of low density, that is to say of less than 0.20 g/cm$^3$, exhibiting good mechanical properties.

Another objective of the invention is to provide a novel organopolysiloxane composition of low viscosity, that is to say of less than 15 000 mPa·s, which is intended to generate, after crosslinking, a low-density silicone foam exhibiting good properties of resistance to combustion.

The Applicant Company has now found, very surprisingly, that it is possible to obtain a silicone foam exhibiting the following properties:
a density of less than 0.20 g/cm$^3$ and preferably of less than 0.20 g/cm$^3$, and
a tensile strength of greater than 0.10 MPa; from a specific composition having a viscosity before crosslinking of less than 15 000 mPa·s.

A subject matter of the present invention is thus an organopolysiloxane composition which, after crosslinking, forms a foam exhibiting the following properties:
a density of less than 0.20 g/cm$^3$,
a tensile strength of greater than 0.10 MPa;
said composition not comprising, before crosslinking:
(i) water as porogenic agent capable of generating, in the presence of a polysiloxane comprising hydride functional groups, gaseous hydrogen,
(ii) polyorganosiloxane comprising hydroxyl groups, and
(iii) cyclic polydiorganosiloxane comprising =-SiH functional groups, and
said composition comprising:
(A) at least one polyorganosiloxane (A) exhibiting, per molecule, at least two $C_2$-$C_6$ alkenyl groups bonded to the silicon and having a viscosity of between 10 and 300 000 mPa·s,
(B) at least one polyorganosiloxane (B) exhibiting, per molecule, at least two hydrogen atoms bonded to the silicon and preferably at least three ≡SiH units and having a viscosity of between 1 and 5000 mPa·s,
(C) a catalytically effective amount of at least one catalyst (C) composed of at least one metal belonging to the platinum group,
(D) at least one compound (D) chosen from the group consisting of n-propanol, n-butanol, n-hexanol and n-octanol,
(E) optionally at least one diorganopolysiloxane oil (E) blocked at each end of its chain by a triorganosiloxy unit, the organic radicals of which bonded to the silicon atoms are chosen from alkyl radicals having from 1 to 8 carbon atoms inclusive, such as the methyl, ethyl, propyl and 3,3,3-trifluoropropyl groups, cycloalkyl groups, such as the cyclohexyl, cycloheptyl and cyclooctyl groups, and aryl groups, such as xylyl, tolyl and phenyl, (F) optionally at least one inorganic and/or metal filler (F), (G) optionally at least one additive (G), and (H) at least one polyorganosiloxane resin (H) corresponding to the following conditions (1) and (2):
(1) said resin is present in a proportion of at least 10% by weight, with respect to the total weight of the polyorganosiloxane (A) and of the polyorganosiloxane resin (H) (=ratio by weight (H)/[(A)+(H)]×100); and
(2) said resin comprises at least two different siloxyl units chosen from those of following formulae (I) and (II):

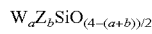  (I)

in which:
the W symbols, which are identical or different, each represent a $C_2$-$C_6$ alkenyl group;
the Z symbols, which are identical or different, each represent a nonhydrolyzable monovalent hydrocarbon group which has no unfavorable effects on the activity of the catalyst, is optionally halogenated and is preferably chosen from alkyl groups and from aryl groups, and
a is 1 or 2, preferably 1, b is 0, 1 or 2 and the sum a+b is equal to 1, 2 or 3, and

  (II)

in which Z has the same meaning as above and c is equal to 0, 1, 2 or 3, and
at least one of the units (I) or (II) is a T or Q unit, with the additional condition that the choice, the nature and the amount of the constituents are determined so that the viscosity of said composition has to be less than 15 000 mPa·s.

All the viscosities with which the present account is concerned correspond to a dynamic viscosity quantity which is measured, in a way known per se, at 25° C. The viscosities are measured using a Brookfield viscosimeter according to the instructions of the AFNOR NFT 76 106 standard of May 1982. These viscosities correspond to a "newtonian" dynamic viscosity quantity at 25° C., that is to say the dynamic viscosity which is measured, in a way known per se, at a shear rate gradient which is sufficiently low for the viscosity measured to be independent of the rate gradient.

As is known per se, the polyorganosiloxane (A), exhibiting, per molecule, at least two $C_2$-$C_6$ alkenyl groups bonded to the silicon and having a viscosity of between 10 and 300 000 mPa·s, can in particular be formed of at least two siloxyl units of formula:

  (III)

in which:
Y is a $C_2$-$C_6$ alkenyl, preferably vinyl,
R is a monovalent hydrocarbon group with no unfavorable effect on the activity of the catalyst which is generally chosen from alkyl groups having from 1 to 8 carbon atoms inclusive, such as the methyl, ethyl, propyl and 3,3,3-trifluoropropyl groups, cycloalkyl groups, such as the cyclohexyl, cycloheptyl and cyclooctyl groups, and aryl groups, such as xylyl, tolyl and phenyl, d is 1 or 2, e is 0, 1 or 2 and d+e=1, 2 or 3, optionally all the other units being units of average formula:

  (IV)

in which R has the same meaning as above and f=0, 1, 2 or 3.

Examples of polyorganosiloxane (A) are, for example, dimethylpolysiloxanes comprising dimethylvinylsilyl ends, (methylvinyl)(dimethyl)polysiloxane copolymers comprising trimethylsilyl ends or (methylvinyl)(dimethyl)polysiloxane copolymers comprising dimethylvinylsilyl ends.

In the form which is most recommended, the polyorganosiloxane (A) comprises end vinylsiloxy units.

As is known per se, the polyorganosiloxane (B), exhibiting, per molecule, at least two hydrogen atoms bonded to the silicon and preferably at least three ≡SiH units and having a viscosity of between 1 and 5000 mPa·s, can in particular be formed of siloxyl units of formula:

  (V)

in which:
X is a monovalent hydrocarbon group with no unfavorable effect on the activity of the catalyst which is generally chosen from alkyl groups having from 1 to 8 carbon atoms inclusive, such as the methyl, ethyl, propyl and 3,3,3-trifluoropropyl groups, cycloalkyl groups, such as the cyclohexyl, cycloheptyl and cyclooctyl groups, and aryl groups, such as xylyl, tolyl and phenyl,
g=1 or 2, preferably=1, i=0, 1 or 2 and g+i=1, 2 or 3, optionally all the other units being units of average formula:

  (VI)

in which X has the same meaning as above and j=0, 1, 2 or 3.

Appropriate polyorganosiloxanes (B) are polymethylhydrosiloxanes or methylhydrodimethylsiloxane copolymers.

The catalyst (C), composed of at least one metal belonging to the platinum group, is also well known. The metals of the platinum group are those known under the name of platinoids, a term which combines together, in addition to platinum, ruthenium, rhodium, palladium, osmium and iridium. Platinum and rhodium compounds are preferably used. Use may in particular be made of the complexes of platinum and of an organic product described in patents U.S. Pat. No. 3,159,601, U.S. Pat. No. 3,159,602, U.S. Pat. No. 3,220,972 and European patents EP-A-0 057 459, EP-A-0 188 978 and EP-A-0 190 530 or the complexes of platinum and of vinylated organosiloxanes described in patent U.S. Pat. No. 3,419,593. The catalyst generally preferred is platinum. Preference is given to the Karstedt solution or complex as described in U.S. Pat. No. 3,775,452.

Mention may be made, among the compounds (D) of use according to the invention, of methanol, ethanol, n-propanol, isopropanol, n-butanol, 2-butanol, tert-butanol, n-hexanol, n-octanol and benzyl alcohol. n-Propanol, n-butanol, n-hexanol and n-octanol are particularly preferred.

Preferably, the constituent (E) is a nonfunctionalized linear polydimethylsiloxane, that is to say comprising repeat units of formula $(CH_3)_2SiO_{2/2}$ and exhibiting, at its two ends, $(CH_3)_3SiO_{1/2}$ units.

Mention may in particular be made, as inorganic filler (F), of reinforcing and bulking fillers.

However, the nature and the amount of the filler will be determined so as to obtain, after mixing all the components, a viscosity of the composition of less than 50 000 mPa·s. Thus, some fillers will be excluded as the result of an excessively high viscosifying power.

These fillers can be provided in the form of very finely divided products, the mean particle diameter of which is less than 0.1 μm. These fillers include in particular fumed silicas and precipitated silicas; their specific surface is generally greater than 10 $m^2/g$ and generally lies within the range 20-300 $m^2/g$.

These fillers can also be provided in the form of more coarsely divided products, with a mean particle diameter of greater than 0.1 μm. Mention may in particular be made, as examples of such fillers, of ground quartz, diatomaceous silicas, calcined clay, titanium oxide of the rutile type, iron, zinc, chromium, zirconium or magnesium oxides, the various forms of alumina (hydrated or nonhydrated), boron nitride, lithopone or barium metaborate; their specific surfaces are generally less than 30 $m^2/g$.

Fillers may have been modified at the surface by treatment with the various organosilicon compounds commonly employed for this use. Thus, these organosilicon compounds can be organochlorosilanes, diorganocyclopolysiloxanes, hexaorganodisiloxanes, hexaorganodisilazanes or diorganocyclopolysilazanes (French patents FR-A-1 126 884, FR-A-1 136 885, FR-A-1 236 505 and British patent GB-A-1 024 234). The treated fillers include, in the majority of cases, from 3 to 30% of their weight of organosilicon compounds. The fillers can be thus treated before or after their incorporation in the formulation.

The fillers can be composed of a mixture of several types of fillers with different particle sizes.

The presence of a specific metal filler (F) makes it possible to rather markedly improve the resistance to combustion of the foams. Mention may be made, as metal fillers (F), for example, of:
(a) an additive based on a mixture of platinum with a mixed iron oxide or a cerium(IV) oxide as described in application FR-A-2 757 869, in particular the following mixtures:
 a mixture of platinum in the platinum complex or compound form and of an $FeO/Fe_2O_3$ mixture;
 a mixture of platinum in the platinum complex or compound form and of a cerium(IV) oxide and/or hydroxide;
 a mixture of platinum in the platinum complex or compound form and of a constituent which is composed of a combination of cerium(IV) oxide and/or hydroxide with titanium oxide $TiO_2$; and
 a mixture of platinum in the platinum complex or compound form and of a constituent which is composed of a combination of cerium(IV) oxide and/or hydroxide, of titanium oxide $TiO_2$ and of an $FeO/Fe_2O_3$ compound,
(b) a mixture of platinum and of a mixed iron oxide of formula $(FeO)_x \cdot (Fe_2O_3)_y$, where the x/y ratio is between 0.05/1 and 1/1, as described in patent application JP-A-76/035 501,
(c) a mixture of platinum with at least one rare earth metal oxide, in particular a mixture of platinum with cerium(IV) oxide $CeO_2$, as described in applications FR-A-2 166 313, EP-A-0 347 349, FR-A-2 166 313 and EP-A-0 347 349,
(d) titanium oxides, for example the products sold by Degussa under the Aeroxide® name, for example the product "Aeroxide® TiO2 PF2", and
(e) aluminum hydroxides, which may or may not be hydrated, iron oxides and cerium oxides or hydroxides.

The metal filler (F) which is particularly preferred is that described in section (a) or (d) above.

It is possible in particular to incorporate, as additive (G), a catalyst inhibitor in order to slow down the crosslinking. These inhibitors are known. Use may in particular be made of organic amines, silazanes, organic oximes, diesters of dicarboxylic acids, acetylenic ketones and acetylenic alcohols (cf., for example, FR-A-1 528 464, 2 372 874 and 2 704 553). The inhibitor, when one of them is used, can be inserted in a proportion of 0.0001 to 5 parts by weight, preferably of 0.001 to 3 parts by weight, per 100 parts of polyorganosiloxane (A). Phosphines, phosphites and phosphonites are also among the inhibitors which can be used in the invention. Mention may in particular be made of the compounds of formula $P(OR)_3$ described in patent U.S. Pat. No. 6,300,455. These inhibitors are added in an amount by weight of between 1 and 50 000 ppm, with respect to the weight of the total silicone composition, in particular between 10 and 10 000 ppm, preferably between 20 and 2000 ppm.

The polyorganosiloxane resins (H) are well-known branched organopolysiloxane oligomers or polymers which are commercially available. They are provided in the form of solutions, preferably siloxane solutions. Mention may be made, as examples of branched organopolysiloxane oligomers or polymers, of "MQ" resins, "MDQ" resins, "TD" resins and "MDT" resins, it being possible for the alkenyl functional groups to be carried by the M, D and/or T siloxyl units. Mention may be made, as example of resins which are particularly well suited, of vinylated MDQ resins having a content by weight of vinyl groups of between 0.2 and 10% by weight.

A convention accepted in the art for denoting the units of silicones according to the number of oxygen atoms bonded to the silicon is used here. This convention uses the letters M, D, T and Q (abbreviations for "imono", "di", "tri" and "quatro") to denote this number of oxygen atoms. This nomenclature of silicones is described, for example, in the work by Walter Noll, "Chemistry and Technology of Silicones", Academic Press, 1968, 2nd edition, on pages 1 to 9.

According to a preferred alternative form of the invention, the organopolysiloxane composition according to the invention is characterized in that:
 the polyorganosiloxane (A) comprises, per molecule, at least two end siloxyl units each comprising a $C_2$-$C_6$ alkenyl group bonded to the silicon, and
 said composition additionally comprises a second polyorganosiloxane (A2) comprising, per molecule, at least three $C_2$-$C_6$ alkenyl groups bonded to the silicon.

Said polyorganosiloxane (A2) has a viscosity at 25° C. of between 10 and 300 000 mPa·s, preferably of between 50 and 10 000 mPa·s and more preferably still of between 100 and 5000 mPa·s, and can in particular be formed of at least three siloxyl units of formula:

(VII)

in which:
Y is a $C_2$-$C_6$ alkenyl, preferably vinyl,
R is a monovalent hydrocarbon group with no unfavorable effect on the activity of the catalyst which is generally chosen from alkyl groups having from 1 to 8 carbon atoms inclusive, such as the methyl, ethyl, propyl and 3,3,3-trifluoropropyl groups, cycloalkyl groups, such as the cyclohexyl, cycloheptyl and cyclooctyl groups, and aryl groups, such as xylyl, tolyl and phenyl,
d is 1 or 2, e is 0, 1 or 2 and d+e=1, 2 or 3, optionally all the other units being units of average formula:

$$R_f SiO_{\frac{4-f}{2}} \qquad (VIII)$$

in which R has the same meaning as for the unit (VII) and f=0, 1, 2 or 3.

According to a preferred embodiment, the polyorganosiloxane (A2) has a viscosity at 25° C. of between 10 and 300 000 mPa·s, preferably of between 50 and 10 000 mPa·s and more preferably still of between 100 and 5000 mPa·s.

The vinlyated polyorganosiloxanes (A) and (A2), the polyorganosiloxane resins (H) and the polyorganosiloxanes comprising hydride functional groups (B) are in amounts such that a ratio of the ≡SiH functional groups to the ≡SiVi groups of in particular between 0.5 and 10 and preferably of between 1 and 6 is provided.

According to another embodiment of the invention, the organopolysiloxane composition according to the invention comprises:
(A) 100 parts by weight of at least one polyorganosiloxane (A) exhibiting, per molecule, at least two $C_2$-$C_6$ alkenyl groups bonded to the silicon and having a viscosity of between 10 and 300 000 mPa·s,
(B) from 0.5 to 50 parts by weight of at least one polyorganosiloxane (B) exhibiting, per molecule, at least two hydrogen atoms bonded to the silicon and preferably at least three ≡SiH units and having a viscosity of between 1 and 5000 mPa·s,
(C) a catalytically effective amount of at least one catalyst (C) composed of at least one metal belonging to the platinum group,
(D) from 0.05 to 50 parts by weight of at least one compound (D) chosen from the group consisting of n-propanol, n-butanol, n-hexanol and n-octanol,
(E) from 0 to 50 parts by weight of at least one diorganopolysiloxane oil (E) blocked at each end of its chain by a triorganosiloxy unit, the organic radicals of which bonded to the silicon atoms are chosen from alkyl radicals having from 1 to 8 carbon atoms inclusive, such as the methyl, ethyl, propyl and 3,3,3-trifluoropropyl groups, cycloalkyl groups, such as the cyclohexyl, cycloheptyl and cyclooctyl groups, and aryl groups, such as xylyl, tolyl and phenyl,
(F) from 0 to 150 parts of at least one inorganic and/or metal filler (F),
(G) from 0 to 10 parts by weight of at least one additive (G), and
(H) at least one polyorganosiloxane resin (H) corresponding to the following conditions (1) and (2):
(1) said resin is present in a proportion of at least 10% by weight, with respect to the total weight of the polyorganosiloxane (A) and of the polyorganosiloxane resin (H) (=ratio by weight (H)/[(A)+(H)]×100); and
(2) said resin comprises at least two different siloxyl units chosen from those of formula:

$$W_a Z_b SiO_{(4-(a+b))/2} \qquad (I)$$

in which:
the W symbols, which are identical or different, each represent a $C_2$-$C_6$ alkenyl group;
the Z symbols, which are identical or different, each represent a nonhydrolyzable monovalent hydrocarbon group which has no unfavorable effects on the activity of the catalyst, is optionally halogenated and is preferably chosen from alkyl groups and from aryl groups, and
a is 1 or 2, preferably 1, b is 0, 1 or 2 and the sum a+b is equal to 1, 2 or 3,
with optionally at least a portion of the other units being units of following average formula (II):

$$Z_c SiO_{(4-c)/2} \qquad (II)$$

in which Z has the same meaning as above and c is equal to 0, 1, 2 or 3, and
at least one of the units (I) or (II) is a T or Q unit,
with the additional condition that the choice, the nature and the amount of the constituents are determined so that the viscosity of said composition has to be less than 15 000 mPa·s.

According to another of its aspects, the present invention relates to a precursor system {two-component (C)} for the silicone composition described above. Such a precursor system is provided in two separate parts A and B intended to be mixed in order to form the composition. The part A comprises the catalyst (C) and the compound (D) and the part B comprises the polyorganosiloxane (B), the other constituents (A), (E), (F), (G) and (H) being present in the part A, in the part B or in the parts A and B.

Another subject matter of the present invention is a silicon foam capable of being obtained by crosslinking an organopolysiloxane composition according to the invention as defined above which exhibits the following properties:
a density of less than 0.20 g/cm³, and
a tensile strength of greater than 0.10 MPa.

The final subject matter of the invention relates to the articles obtained by the forming of silicone foam according to the invention.

The invention is in particular of use for the preparation of filling foams or foam seals in the construction, transportation, electrical insulation or domestic electrical appliance field.

The invention is also of use in the pad printing or paramedical field.

The present invention will now be described in more detail using embodiments taken as nonlimiting example.

EXAMPLES 1 TO 8

Preparation of Silicon Foams Which Crosslink at Ambient Temperature

In the present account:
the term "Vi" means a vinyl group "—CH$_2$=CH$_2$",
the abbreviation "T/S" means the tensile strength in MPa according to the AFNOR NF T 46002 standard,
the abbreviation "E/B" means the elongation at break in % according to the preceding standard,
the abbreviation "Tr/S means the tear strength in N/mm.

A two-component composition comprising parts P1 and P2, the compositions of which are described in table 1, is prepared.

1) Nature of the Ingredients Mentioned in Part P1 of the Compositions Tested:
  a: Vinylated polyorganosiloxane resin comprising M, $D^{Vi}$ and Q siloxyl units (or "$MD^{Vi}Q$").
  b: Polydimethylsiloxane oil blocked at each of the chain ends by a $Vi(CH_3)_2SiO_{1/2}$ unit, having a viscosity of 100 000 mPa·s at 25° C.
  b1: Polydimethylsiloxane blocked by $(CH_3)_2ViSiO_{1/2}$ units, the viscosity of which is 3500 mPa·s at 25° C.
  b2: Polydimethylsiloxane blocked by $(CH_3)_2ViSiO_{1/2}$ units, the viscosity of which is 60 000 mPa·s at 25° C.
  b3: Polydimethylsiloxane blocked by $(CH_3)_2ViSiO_{1/2}$ units, the viscosity of which is 600 mPa·s at 25° C.
  c: Diatomaceous earth, sold under the trade name Celite-SF.
  d: Butanol.
  d1: Water.
  e: Karstedt platinum catalyst.
  f: Polydimethylsiloxane oil blocked at each of the chain ends by a $(CH_3)_3SiO_{1/2}$ unit, having a viscosity of 1000 mPa·s at 25° C.

2) Nature of the Ingredients Mentioned in Part P2 of the Compositions:
  a: Vinylated polyorganosiloxane resin comprising M, $D^{vi}$ and Q siloxyl units (or "$MD^{Vi}Q$") with $M=(CH_3)_3SiO_{1/2}$, $D^{vi}=(CH_3)ViSiO_{2/2}$ and $Q=SiO_{4/2}$.
  b: Polydimethylsiloxane oil blocked at each of the chain ends by a $Vi(CH_3)_2SiO_{1/2}$ unit, having a viscosity of 100 000 mPa·s at 25° C.
  b1: Polydimethylsiloxane blocked by $(CH_3)_2ViSiO_{1/2}$ units, the viscosity of which is 3500 mPa·s. The vinyl content of this composition is 0.6% by weight.
  b2: Polydimethylsiloxane blocked by $(CH_3)_2ViSiO_{1/2}$ units, the viscosity of which is 60 000 mPa·s. The vinyl content of this composition is 0.8% by weight.
  b3: Polydimethylsiloxane blocked by $(CH_3)_2ViSiO_{1/2}$ units, the viscosity of which is 600 mPa·s at 25° C.
  f: Polydimethylsiloxane oil blocked at each of the chain ends by a $(CH_3)_3SiO_{1/2}$ unit, having a viscosity of 1000 mPa·s at 25° C.
  g: Poly(vinylmethyl) (dimethyl)siloxane oil having a content of Dvi units of 2% by weight and of $M^{Vi}$ units of 0.4% by weight (or with pendant vinyl groups).
  i: Polydimethylsiloxane oil blocked at each of the chain ends by a $(CH_3)_2HSiO_{1/2}$ unit.
  h: Polymethylhydrosiloxane oil blocked at each of the chain ends by a $(CH_3)_3SiO_{1/2}$ unit.
  i: Solution comprising 1% of ethynylcyclohexanol in a polydimethylsiloxane oil blocked by $(CH_3)_2ViSiO_{1/2}$ units and having a viscosity of 600 mPa·s at 25° C.

The compositions tested are described in Table 1 below.

TABLE 1

| | | COMPOSITIONS: PARTS BY WEIGHT | | | | | | | |
|---|---|---|---|---|---|---|---|---|---|
| | Constituents | Example 1 | Example 2 | Example 3 | Example 4 | Example 5 | Counter-example 6 | Counter-example 7 | Counter-example 8 |
| Part P1 | a | 18.75 | 20.25 | 32.4 | 20.25 | 20.25 | 0 | 0 | 20.25 |
| | b1 | 56.25 | 60.75 | 0 | 60.75 | 60.75 | 0 | 87 | 60.75 |
| | b2 | 0 | 0 | 48.6 | 0 | 0 | 0 | 0 | 0 |
| | b3 | 0 | 0 | 6 | 0 | 0 | 0 | 0 | 0 |
| | b | 6 | 6 | 0 | 6 | 6 | 87 | 0 | 6 |
| | c | 10 | 10 | 10 | 10 | 10 | 10 | 10 | 10 |
| | d | 3 | 3 | 3 | 3 | 3 | 3 | 3 | 0 |
| | d' | 0 | 0 | 0 | 0 | 0 | 0 | 0 | 0.73 |
| | e | 0.09 | 0.09 | 0.09 | 0.09 | 0.09 | 0.09 | 0.09 | 0.09 |
| | f | 6 | 0 | 0 | 0 | 0 | 0 | 0 | 2.27 |
| Part P2 | a | 10 | 16.1 | 25.7 | 13.5 | 13.5 | 0 | 0 | 14 |
| | b1 | 30 | 48.2 | 0 | 40.5 | 40.5 | 0 | 72.3 | 42 |
| | b2 | 0 | 0 | 38.6 | 0 | 0 | 0 | 0 | 0 |
| | b3 | 0 | 0 | 10 | 0 | 0 | 0 | 0 | 0 |
| | b | 30 | 10 | 0 | 20.3 | 18.3 | 72.3 | 0 | 18.3 |
| | g | 0 | 0 | 0 | 0 | 2 | 2 | 2 | 0 |
| | h | 18 | 18 | 18 | 18 | 18 | 18 | 18 | 18 |
| | i | 7 | 7 | 7 | 7 | 7 | 7 | 7 | 7 |
| | j | 0.1 | 0.1 | 0.1 | 0.1 | 0.1 | 0.1 | 0.1 | 0.1 |
| | f | 4.9 | 0.6 | 0.6 | 0.6 | 0.6 | 0.6 | 0.6 | 0.6 |
| | Viscosity P1 + P2 (mPa·s) | 5200 | 3200 | 11 600 | 4400 | 3500 | 55 000 | 2100 | 5200 |

3) Implementation:

50 parts by volume of the component P2 are added to 50 parts by volume of the component P1. Foaming and crosslinking are obtained after manual mixing using a spatula at 23° C. for approximately 30 seconds. The foams obtained are evaluated (results recorded in table 2).

4) Tests:

TABLE 2

Examples according to the invention

| Properties | | Example 1 | Example 2 | Example 3 | Example 4 | Example 5 |
|---|---|---|---|---|---|---|
| Density of the crosslinked foam (g/cm³) | | 0.18 | 0.18 | 0.16 | 0.18 | 0.18 |
| S00H after 1 day at 23° C. | | 33 ± 1 | 54 ± 1 | 55 ± 1 | 44 ± 1 | 51 ± 2 |
| Mechanical properties after 1 day at 23° C. | T/S (MPa) | 0.16 | 0.20 | 0.16 | 0.13 | 0.20 |
| | E/B (%) | 66 | 49 | 47 | 47 | 49 |
| | Tr/S (N/mm) | 1.0 | 0.7 | 1.03 | 1.05 | 0.8 |
| Size of the bubbles | | Small | Small | Small | Small | Small |

TABLE 3

Comparative examples

| Properties | | Counter-example 6 | Counter-example 7 | Counter-example 8 |
|---|---|---|---|---|
| Density of the crosslinked foam (g/cm³) | | 0.26 | 0.26 | 0.28 |
| S00H after 1 day at 23° C. | | Not measurable | 23 ± 2 | 54 ± 1 |
| Mechanical properties after 1 day at 23° C. | T/S (MPa) | Not measurable | 0.04 | 0.39 |
| | E/B (%) | Not measurable | 49 | 57 |
| | Tr/S (N/mm) | Not measurable | 0.3 | 1.7 |
| Size of the bubbles | | Not measurable | Large | Small |

Size of the pores below 1 mm = "small bubbles".
Size of the pores >> 1 mm = "large bubbles".

Examples 1 to 5 and counter examples 6 to 8 demonstrate the indispensible presence of a resin and the importance of the foaming system. This is because the replacement of the alcohol by water results in foams with markedly higher densities (see counter example 8, presence of resin but with water-based foaming system). The compositions according to the invention make it possible to obtain foams with low densities (of less than 0.20 g/cm³) which have good mechanical properties.

Examples 1, 2 and 3 show that a high content of resin makes it possible to reduce the densities and to increase the Shore 00 hardness (S00H).

Examples 4 and 5 show that the addition of a small amount of an oil with vinyl units in the chain makes it possible to vary the S00H while retaining a low density and good mechanical properties.

For counter example 6, it was not possible to prepare the test specimens in order to measure the mechanical properties and the hardness as a result of a viscosity of greater than 50 000 mPa·s (difficult spreading of the composition).

EXAMPLES 9 TO 11

Preparation of Silicone Foams Which Crosslink at Ambient Temperature and Which Have Good Fire Resistance A mixture is prepared by mixing the ingredients as described in table 4.

1) Nature of the Ingredients Mentioned in Part P1 of the Compositions Tested:
   a: Vinylated polyorganosiloxane resin comprising M, $D^{vi}$ and Q siloxyl units (or "$MD^{Vi}Q$").
   b: Polydimethylsiloxane oil blocked at each of the chain ends by a $Vi(CH_3)_2SiO_{1/2}$ unit, having a viscosity of 100 000 mPa·s at 25° C.
   b1: Polydimethylsiloxane blocked by $(CH_3)_2ViSiO_{1/2}$ units, the viscosity of which is 3500 mPa·s at 25° C.
   c: Diatomaceous earth, sold under the trade name Celite-SF.
   c1: Titanium dioxide, sold under the trade name Aeroxide® TiO2 P25.
   c2: Titanium dioxide, sold under the trade name Aeroxide® TiO2 PF2.
   c3: Iron oxide, sold under the trade name Bayferrox® 306.
   c4: Cerium hydroxide.
   c5: Alumina trihydrate, sold under the trade name Apyral® 40 VSL.
   d: Butanol.
   e: Karstedt platinum catalyst.
   f: Polydimethylsiloxane oil blocked at each of the chain ends by a $(CH_3)_3SiO_{1/2}$ unit, having a viscosity of 1000 mPa·s at 25° C.

2) Nature of the Ingredients Mentioned in Part P2 of the Compositions Tested:
   a: Vinylated polyorganosiloxane resin comprising M, $D^{Vi}$ and Q siloxyl units (or "$MD^{Vi}Q$").
   b: Polydimethylsiloxane oil blocked at each of the chain ends by a $Vi(CH_3)_2SiO_{1/2}$ unit, having a viscosity of 100 000 mPa·s at 25° C.
   b1: Polydimethylsiloxane blocked by $(CH_3)_2ViSiO_{1/2}$ units, the viscosity of which is 3500 mPa·s. The vinyl content of this composition is 0.6% by weight.
   f: Polydimethylsiloxane oil blocked at each of the chain ends by a $(CH_3)_3SiO_{1/2}$ unit, having a viscosity of 1000 mPa·s at 25° C.
   i: Polydimethylsiloxane oil blocked at each of the chain ends by a $(CH_3)_2HSiO_{1/2}$ unit.
   h: Polymethylhydrosiloxane oil blocked at each of the chain ends by a $(CH_3)_3SiO_{0.5}$ unit.
   j: Solution comprising 1% of ethynylcyclohexanol in a polydimethylsiloxane oil blocked by $(CH_3)_2ViSiO_{1/2}$ units, having a viscosity of 600 mPa·s at 25° C.

The compositions tested are described in table 4 below.

TABLE 4

COMPOSITIONS: PARTS BY WEIGHT

| | Constituents | Example 9 | Example 10 | Example 11 |
|---|---|---|---|---|
| Part P1 | a | 18.75 | 18.75 | 18.75 |
| | b1 | 56.25 | 56.25 | 56.25 |

TABLE 4-continued

COMPOSITIONS: PARTS BY WEIGHT

| Constituents | | Example 9 | Example 10 | Example 11 |
|---|---|---|---|---|
| | b | 6 | 6 | 6 |
| | c | 4.5 | 8 | 0 |
| | c1 | 1 | 0 | 0 |
| | c2 | 0 | 2 | 0 |
| | c3 | 0.5 | 0 | 0 |
| | c4 | 4 | 0 | 0 |
| | c5 | 0 | 0 | 10 |
| | d | 3 | 3 | 3 |
| | e | 0.09 | 0.09 | 0.09 |
| | f | 6 | 6 | 6 |
| Part P2 | a | 10 | 10 | 10 |
| | b1 | 30 | 30 | 30 |
| | b | 30 | 30 | 30 |
| | h | 18 | 18 | 18 |
| | i | 7 | 7 | 7 |
| | j | 0.1 | 0.1 | 0.1 |
| | f | 4.9 | 4.9 | 4.9 |
| Viscosity P1 + P2 (mPa·s) | | 4800 | 5100 | 4900 |

3) Implementation:

50 parts by volume of the component P2 are added to 50 parts by volume of the component P1. Foaming and crosslinking are obtained after manual mixing using a spatula at 23° C. for approximately 30 seconds. The foams obtained are homogeneous.

4) Tests:

As shown by the results of examples 9 to 11 recorded in table 5 below, it is possible to obtain foams with low densities (less than 0.20 g/cm³) which have good mechanical properties and excellent fire resistance properties.

TABLE 5

| Properties | | Example 9 | Example 10 | Example 11 |
|---|---|---|---|---|
| Density of the crosslinked foam (g/cm3) | | 0.19 | 0.19 | 0.18 |
| S00H after 1 day at 23° C. | | 32 ± 2 | 32 ± 3 | 40 ± 1 |
| Mechanical properties after 1 day at 23° C. | T/S | 0.13 | 0.15 | 0.21 |
| | E/B | 69 | 65 | 65 |
| | Tr/S | 0.80 | 0.81 | 0.73 |
| Flame retardancy according to the UL 94 V test | | V-0 | V-0 | V-2 |

The tests for flame retardancy of the elastomers obtained are carried out according to the protocol defined by "The Underwriters Laboratories" (UL 94V), fourth edition of 18 Jun. 1991, which consists in exposing a test specimen (the length of which is 127 mm, the width of which is 12.7 mm and the thickness of which is 2 mm) vertically to a flame of 980° C. for 10 seconds, and the extinguishing time is measured after this exposure.

The result is rated according to the following criteria a) to d):

a) V-0: the maximum burning time is less than 10 seconds (self-extinguishing); no drips of glowing material (excellent fire resistance);

b) V-1: the maximum burning time is less than 30 seconds (self-extinguishing); no drips of glowing material (good fire resistance), c) V-2: the maximum burning time is less than 30 seconds (self-extinguishing); drops of glowing material (fire resistance), and d) N.C.: not classified (poor fire resistance).

What is claimed is:

1. An organopolysiloxane composition crosslinkable into a silicone foam having a density of less than 0.20 g/cm³, and a tensile strength of greater than 0.10 MPa;

said composition consisting essentially of:

(A) at least one polyorganosiloxane (A) having, per molecule, at least two $C_2$-$C_6$ alkenyl radicals bonded to silicon and having a viscosity ranging from 10 to 300,000 mPa·s and said polyorganosiloxane (A) comprises end vinylsiloxy units, (B) at least one polyorganosiloxane (B) having, per molecule, at least two hydrogen atoms bonded to silicon and having a viscosity ranging from 1 to 5,000 mPa·s, (C) a catalytically effective amount of at least one platinum group metal catalyst (C), (D) at least one compound (D) selected from the group consisting of n-propanol, n-butanol, n-hexanol and n-octanol, (E) optionally, at least one diorganopolysiloxane oil (E) blocked at each end of its chain by a triorganosiloxy structural unit, the organic radicals of which bonded to silicon atoms are selected from among alkyl radicals having from 1 to 8 carbon atoms, 3,3,3-trifluoropropyl radicals, cycloalkyl radicals, and aryl radicals, (F) optionally, at least one inorganic and/or metal filler (F), (G) optionally, at least one additive (G), and (H) at least one polyorganosiloxane resin (H), with the provisio that:

(1) said resin (H) is present in a proportion of at least 10% by weight, with respect to the total weight of the polyorganosiloxane (A) and of the polyorganosiloxane resin (H) (=ratio by weight (H)/[(A)+(H)]×100); and (2) said resin (H) comprises at least two different siloxyl structural units selected from among those of the following formulae (I) and (II):

$$W_a Z_b SiO_{(4-(a+b))/2} \qquad (I)$$

in which:

the W symbols, which may be identical or different, are each a $C_2$-$C_6$ alkenyl radical;

the Z symbols, which may be identical or different, are each a nonhydrolyzable monovalent, optionally halogenated hydrocarbon radical that does not adversely affect the activity of the catalyst;

a is 1 or 2, b is 0, 1 or 2 and the sum a+b is equal to 1, 2 or 3, and $$Z_c SiO_{(4-c)/2} \qquad (II)$$

in which Z is as defined above and c is equal to 0, 1, 2 or 3, and at least one of the structural units (I) or (II) is a T or Q unit, and with the further proviso that the viscosity of said composition is less than 15,000 mPa s, said composition being devoid of:

(i) water, as porogenic agent generating, in the presence of a polysiloxane comprising hydride functional groups, gaseous hydrogen, (ii) polyorganosiloxane comprising hydroxyl groups, and (iii) cyclic polydiorganosiloxane comprising ≡SiH functional groups.

2. The crosslinkable organopolysiloxane composition as defined by claim 1, said at least one polyorganosiloxane (B) having, per molecule, at least three ≡SiH structural units.

3. The crosslinkable organopolysiloxane composition as defined by claim 1, wherein the symbols Z are each an alkyl or aryl radical.

4. The crosslinkable organopolysiloxane composition as defined by claim 1, wherein:
the at least one polyorganosiloxane (A) comprises, per molecule, at least two end siloxyl units each of which comprises a $C_2$-$C_6$ alkenyl radical bonded to silicon.

5. The crosslinkable organopolysiloxane composition as defined by claim 1, which consists essentially of:
(A) 100 parts by weight of at least one polyorganosiloxane (A) having, per molecule, at least two $C_2$-$C_6$ alkenyl radicals bonded to silicon and having a viscosity ranging from 10 to 300,000 mPa s and said polyorganosiloxane (A) comprises end vinylsiloxy units,
(B) from 0.5 to 50 parts by weight of at least one polyorganosiloxane (B) having, per molecule, at least two hydrogen atoms bonded to silicon and having a viscosity ranging from 1 to 5,000 mPa s,
(C) a catalytically effective amount of at least one platinum group metal catalyst (C),
(D) from 0.05 to 50 parts by weight of at least one compound (D) selected from the group consisting of n-propanol, n-butanol, n-hexanol and n-octanol,
(E) from 0 to 50 parts by weight of at least one diorganopolysiloxane oil (E) blocked at each end of its chain by a triorganosiloxy structural unit, the organic radicals of which bonded to silicon atoms are selected from among alkyl radicals having from 1 to 8 carbon atoms, 3,3,3-trifluoropropyl radicals, cycloalkyl radicals, and aryl radicals,
(F) from 0 to 150 parts of at least one inorganic and/or metal filler (F),
(G) from 0 to 10 parts by weight of at least one additive (G), and
(H) at least one polyorganosiloxane resin (H), with the proviso that:
(1) said resin (H) is present in a proportion of at least 10% by weight, with respect to the total weight of the polyorganosiloxane (A) and of the polyorganosiloxane resin (H) (=ratio by weight (H)/[(A)+(H)]×100); and
(2) said resin (H) comprises at least two different siloxyl structural units selected from among those of the formula:

$$W_a Z_b SiO_{(4-c)/2} \qquad (I)$$

in which:
the W symbols, which may be identical or different, are each a $C_2$-$C_6$ alkenyl radical;
the Z symbols, which may be identical or different, are each a nonhydrolyzable monovalent, optionally halogenated hydrocarbon radical that does not adversely affect the activity of the catalyst; and
a is 1 or 2, b is 0, 1 or 2 and the sum a+b is equal to 1, 2 or 3; and
optionally, at least a portion of the other units being structural units of the following average formula (II):

$$Z_c SiO_{(4-c)/2} \qquad (II)$$

In which Z is as defined above and c is equal to 0, 1, 2 or 3, and
at least one of the structural units (I) or (II) is a T or Q unit, and
with the further proviso that the viscosity of said composition is less than 15,000 mPa s.

6. The crosslinkable organopolysiloxane composition as defined by claim 1, provided in two parts (two-component), one part A comprising the catalyst (C) and the compound (D) and one part B comprising the polyorganosiloxane (B), and the other constituents (A), (E), (F), (G) and (H) are present in the part A, in the part B or in the parts A and B.

7. A silicone foam having the following properties:
a density of less than 0.20 g/cm³, and
a tensile strength of greater than 0.10 MPa;
said silicone foam having been produced by crosslinking the crosslinkable organopolysiloxane composition as defined by claim 1.

8. A filling foam or foam seal for the construction, transportation, electrical insulation or domestic electrical appliance field, comprising the silicone foam as defined by claim 7.

9. A pad printing silicone foam, comprising that as defined by claim 7.

* * * * *